(12) United States Patent
Israr et al.

(10) Patent No.: US 10,297,120 B2
(45) Date of Patent: May 21, 2019

(54) HAPTIC EFFECT GENERATION SYSTEM

(71) Applicant: Disney Enterprises, Inc., Burbank, CA (US)

(72) Inventors: Ali Israr, Monroeville, PA (US); Adam A. Fritz, Valencia, CA (US); Zachary T. Schwemler, Philadelphia, PA (US); Siyan Zhao, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 37 days.

(21) Appl. No.: 15/377,937

(22) Filed: Dec. 13, 2016

(65) Prior Publication Data

US 2018/0165925 A1 Jun. 14, 2018

(51) Int. Cl.
G08B 6/00 (2006.01)
G09B 21/00 (2006.01)
H04B 3/36 (2006.01)
G06F 3/01 (2006.01)

(52) U.S. Cl.
CPC .............. *G08B 6/00* (2013.01); *G06F 3/016* (2013.01)

(58) Field of Classification Search
CPC .............. G08B 6/00; G06F 3/016; G06F 3/16
See application file for complete search history.

(56) References Cited

U.S. PATENT DOCUMENTS

| | | | | |
|---|---|---|---|---|
| 7,623,114 B2 * | 11/2009 | Rank | ................ | A63F 13/5255 345/156 |
| 7,982,711 B2 * | 7/2011 | Anastas | ................ | G06F 3/016 318/568.17 |
| 8,849,587 B1 * | 9/2014 | Lightle | ................ | G01R 31/027 340/646 |
| 9,086,755 B2 * | 7/2015 | Cho | ................ | G06F 3/0416 |
| 9,319,150 B2 * | 4/2016 | Peeler | ................ | H04B 15/00 |
| 9,619,029 B2 * | 4/2017 | Lacroix | ................ | A63F 13/23 |
| 9,635,440 B2 * | 4/2017 | Lacroix | ................ | H04N 21/4122 |
| 9,786,287 B2 * | 10/2017 | Lacroix | ................ | G06F 3/016 |
| 2003/0061932 A1 * | 4/2003 | Tanaka | ................ | G10H 3/146 84/734 |

(Continued)

OTHER PUBLICATIONS

Electronic Projects, Digital DC Motor Speed Control With LED Display Circuit and Electronics Project, Jan. 10, 2015.*

(Continued)

*Primary Examiner* — Quang Pham
(74) *Attorney, Agent, or Firm* — Farjami & Farjami LLP

(57) ABSTRACT

A haptic effect generation system includes a computing platform including a hardware processor, an analog-to-digital converter (ADC), a digital-to-analog converter (DAC), and a memory storing a haptic software code, as well as a haptic transformer coupled to the computing platform. The haptic transformer receives an input signal, and transforms the input signal to a first audio signal corresponding to the input signal. The ADC converts the first audio signal to a first audio data. The hardware processor executes the haptic software code to receive the first audio data from the ADC, and to generate a second audio data using the first audio data, the second audio data corresponding to a desired haptic effect. The DAC converts the second audio data to a second audio signal. The haptic transformer then transforms the second audio signal to a haptic actuator signal for producing the desired haptic effect.

20 Claims, 5 Drawing Sheets

(56) References Cited

U.S. PATENT DOCUMENTS

| | | | |
|---|---|---|---|
| 2006/0017691 A1* | 1/2006 | Cruz-Hernandez | G06F 3/016 345/156 |
| 2009/0021473 A1* | 1/2009 | Grant | G06F 3/016 345/156 |
| 2009/0128306 A1* | 5/2009 | Luden | G06F 3/016 340/407.1 |
| 2010/0231539 A1* | 9/2010 | Cruz-Hernandez | G06F 3/016 345/173 |
| 2011/0202155 A1* | 8/2011 | Ullrich | G06F 3/016 700/94 |
| 2011/0215913 A1* | 9/2011 | Ullrich | G06F 3/016 340/407.1 |
| 2013/0106691 A1* | 5/2013 | Rank | A63F 13/5255 345/156 |
| 2014/0143682 A1* | 5/2014 | Druck | G06Q 10/107 715/752 |
| 2014/0205260 A1* | 7/2014 | Lacroix | H04N 5/765 386/201 |
| 2014/0292501 A1* | 10/2014 | Lim | G08B 6/00 340/407.2 |
| 2015/0070149 A1* | 3/2015 | Cruz-Hernandez | G06F 3/016 340/407.1 |
| 2015/0077324 A1* | 3/2015 | Birnbaum | G06F 3/016 345/156 |
| 2015/0355712 A1* | 12/2015 | Rihn | G06F 3/165 340/407.2 |
| 2015/0362991 A1* | 12/2015 | Koga | G06F 3/013 715/810 |
| 2016/0007095 A1* | 1/2016 | Lacroix | H04N 21/4122 348/552 |
| 2016/0162027 A1* | 6/2016 | Cruz-Hernandez | G06F 3/016 340/407.2 |
| 2016/0162028 A1* | 6/2016 | Lacroix | H04N 5/765 386/239 |
| 2016/0342212 A1* | 11/2016 | Weddle | G08B 6/00 |
| 2016/0366450 A1* | 12/2016 | Hamam | H04L 67/2823 |
| 2017/0092084 A1* | 3/2017 | Rihn | G06F 3/167 |
| 2017/0277330 A1* | 9/2017 | Bae | G06F 3/01 |
| 2017/0364143 A1* | 12/2017 | Danieau | G06F 3/016 |

OTHER PUBLICATIONS

Bach-y-Rita, et al. "Sensory Substitution and the Human-Machine Interface." *Trends in Cognitive Sciences*, vol. 7, No. 12. Dec. 2003. pp. 541-546.

Konishi, Y., et al. "Synesthesia suit: the full body immersive experience," *SIGGRAPH Emerging Technologies*, 2016. pp. 1.

O. Bau, et al. "TeslaTouch: Electrovibration for Touch Surfaces" *User Interface Software and Technology*, 2010 pp. 283-292.

Sodhi, et al. "AIREAL: Interactive Tactile Experiences in Free Air." *ACM Transactions on Graphics (TOG)*, v.32 n.4, Jul. 2013. pp. 1-10.

* cited by examiner

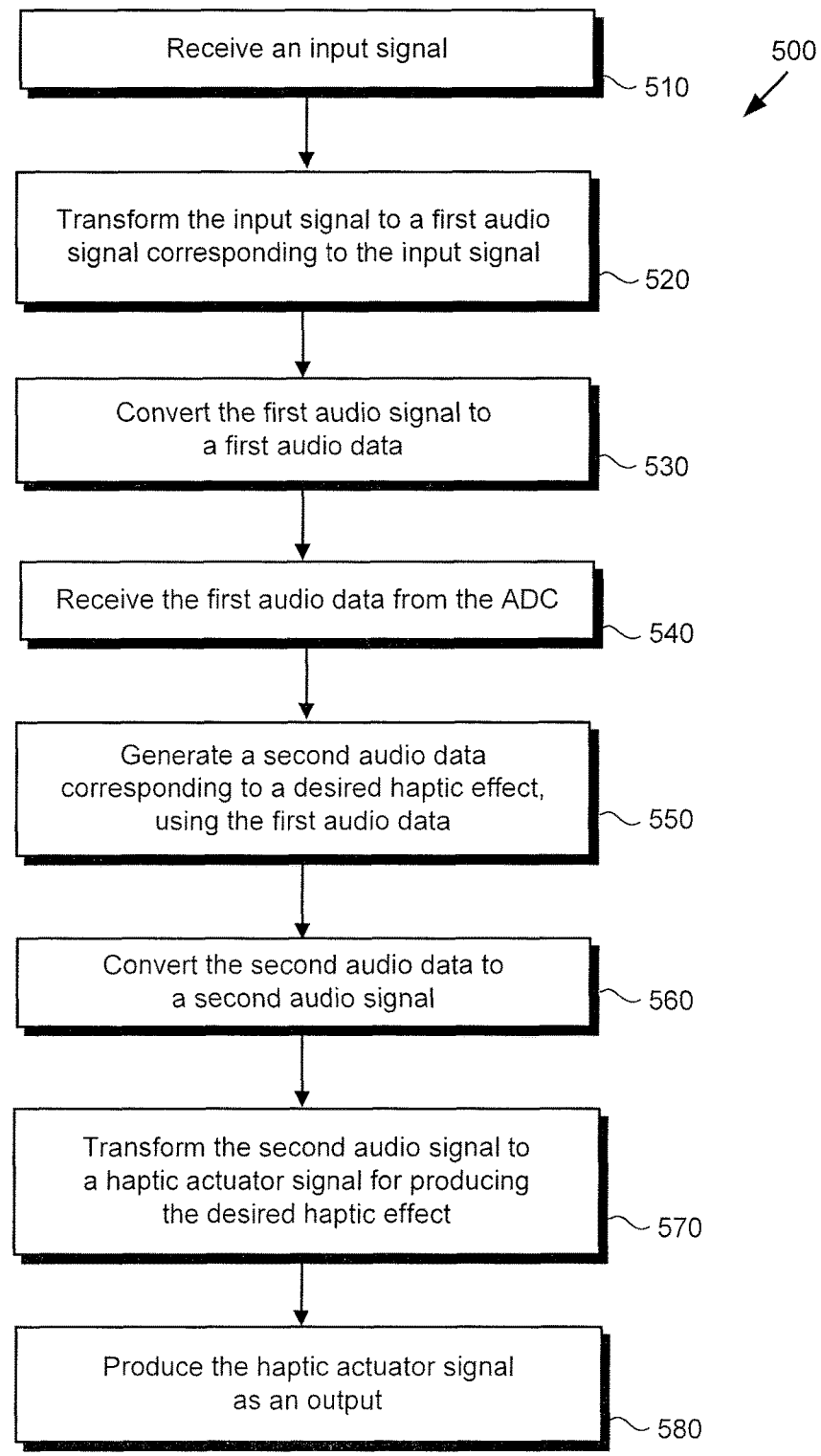

HAPTIC EFFECT GENERATION SYSTEM

BACKGROUND

Modern electronic devices are increasingly being designed to engage users via multiple sensory modes. For example, personal communication devices may utilize a combination of visual, auditory, and haptic modes to interact with a user. With respect to the visual and auditory effects produced by modern electronic devices, the conventional art includes a wide variety of tools, application programming interfaces (APIs), and editing software for working with audio-visual content. In addition, there presently exists considerable expertise in producing audio-visual experiences providing educational, therapeutic, social, and entertainment focused interactions. However, the conventional art lacks a comparable richness in hardware technologies, software tools, and technical expertise for the development of haptic based interactions.

SUMMARY

There are provided haptic effect generation systems and methods, substantially as shown in and/or described in connection with at least one of the figures, and as set forth more completely in the claims.

BRIEF DESCRIPTION OF THE DRAWINGS

FIG. 5 shows a flowchart presenting an exemplary method for generating haptic effects, according to one implementation.

DETAILED DESCRIPTION

Figure 1:
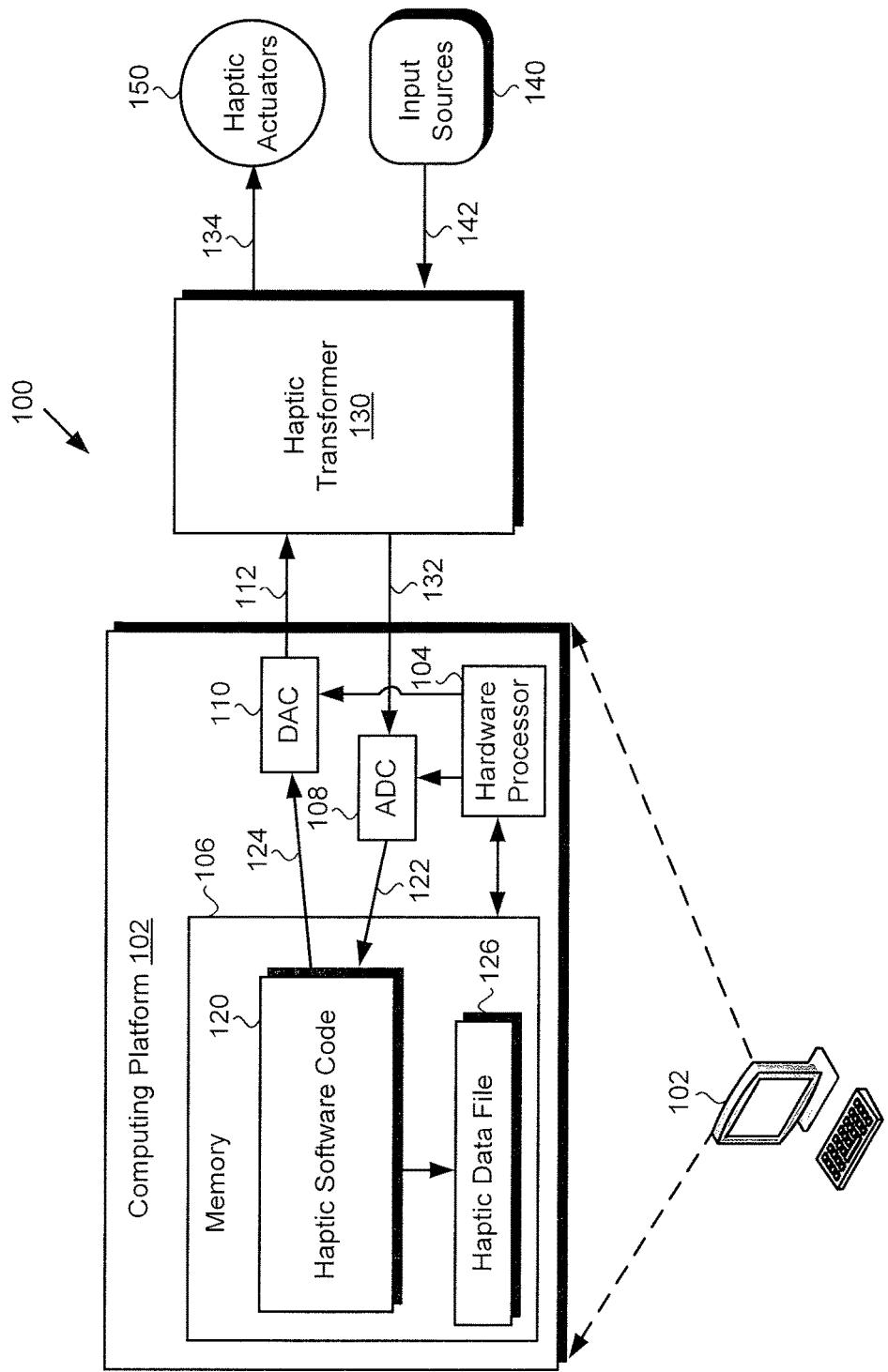
FIG. 1 shows a diagram of a haptic effect generation system, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As noted above, modern electronic devices are increasingly being designed to engage users via multiple sensory modes, including visual, auditory, and haptic modes. As also noted above, the conventional art includes a wide variety of tools, application programming interfaces (APIs), and editing software for working with audio-visual content, as well as considerable expertise in producing audio-visual experiences. However, the conventional art lacks a comparable richness in hardware technologies, software tools, and technical expertise for the development of haptic based interactions.

The present application is directed to haptic effect generation systems and methods. The haptic effect generation systems and methods disclosed in the present application enable the creation, editing, storing, sharing, and broadcasting of haptic data files corresponding respectively to a broad range of haptic effects. Such a haptic effect generation system can be implemented through use of a computing platform coupled to a haptic transformer and including a hardware processor for executing a haptic software code. Moreover, the haptic transformer can advantageously be implemented using readily available audio based hardware components. As a result, the haptic effect generation systems and methods disclosed in the present application are advantageously easy to use, simple to adopt, and can be implemented to produce a wide variety of haptic user interactions.

FIG. 1 shows a diagram of an exemplary haptic effect generation system for implementing the inventive concepts described above. Haptic effect generation system 100 includes haptic transformer 130 coupled to computing platform 102, which itself includes hardware processor 104, memory 106, analog-to-digital converter (ADC) 108, and digital-to-analog converter (DAC) 110. As shown in FIG. 1, ADC 108 and DAC 110 are controlled by hardware processor 104. As further shown in FIG. 1, memory 106 stores haptic software code 120, and may include haptic data file 126 produced by haptic software code 120 when executed by hardware processor 104. Also shown in FIG. 1 are one or more input sources 140 and haptic actuators 150.

It is noted that, in some implementations, haptic effect generation system 100 may include one or more input sources 140 and/or haptic actuators 150. However, in other implementations, haptic effect generation system 100 may receive input signal 142 from one or more input sources 140 external to haptic effect generation system 100. Moreover, in some implementations, haptic effect generation system 100 may send haptic actuator signal 134 to haptic actuators 150 external to haptic effect generation system 100. It is further noted that although computing platform 102 is shown as a personal computer (PC) in FIG. 1, that representation is provided merely as an example. In other implementations, computing platform 102 may be implemented as a network server, or may take the form of another type of personal communication device, such as a smartphone or tablet computer, for example.

According to the exemplary implementation shown in FIG. 1, haptic transformer 130 of haptic effect generation system 100 receives input signal 142 from one or more input sources 140, and transforms input signal 142 to first audio signal 132 corresponding to input signal 142. ADC 108 of haptic effect generation system 100 converts first audio signal 132 to first audio data 122. Hardware processor 104 of computing platform 102 executes haptic software code 120 to receive first audio data 122 from ADC 108, and to generate second audio data 124 using first audio data 122.

Second audio data 124 corresponds to a desired haptic effect, and may be utilized in a process to produce the desired haptic effect, or may be stored in haptic data file 126, by hardware processor 104, for later use. It is noted that, when stored by hardware processor 104 in haptic data file 126, second audio data 124 may be subsequently edited, shared, such as through being copied, and/or may be broadcast, such as by being transmitted to another computing platform (other computing platform not shown in FIG. 1). It is further noted that haptic data file 126 may be an audio data file, and may be stored as an MPEG-1 and/or MPEG-2 Audio Layer III (MP3) file, or as a Waveform Audio File Format (WAV) file, for example.

When used to produce the desired haptic effect, second audio data 124 is converted to second audio signal 112 by DAC 110. Haptic transformer 130 receives second audio signal 112 from DAC 110 and transforms second audio signal 112 to haptic actuator signal 134, which is produced as an output to haptic actuators 150. Haptic actuators 150 may then instantiate the desired haptic effect based on haptic actuator signal 134.

Figure 2:
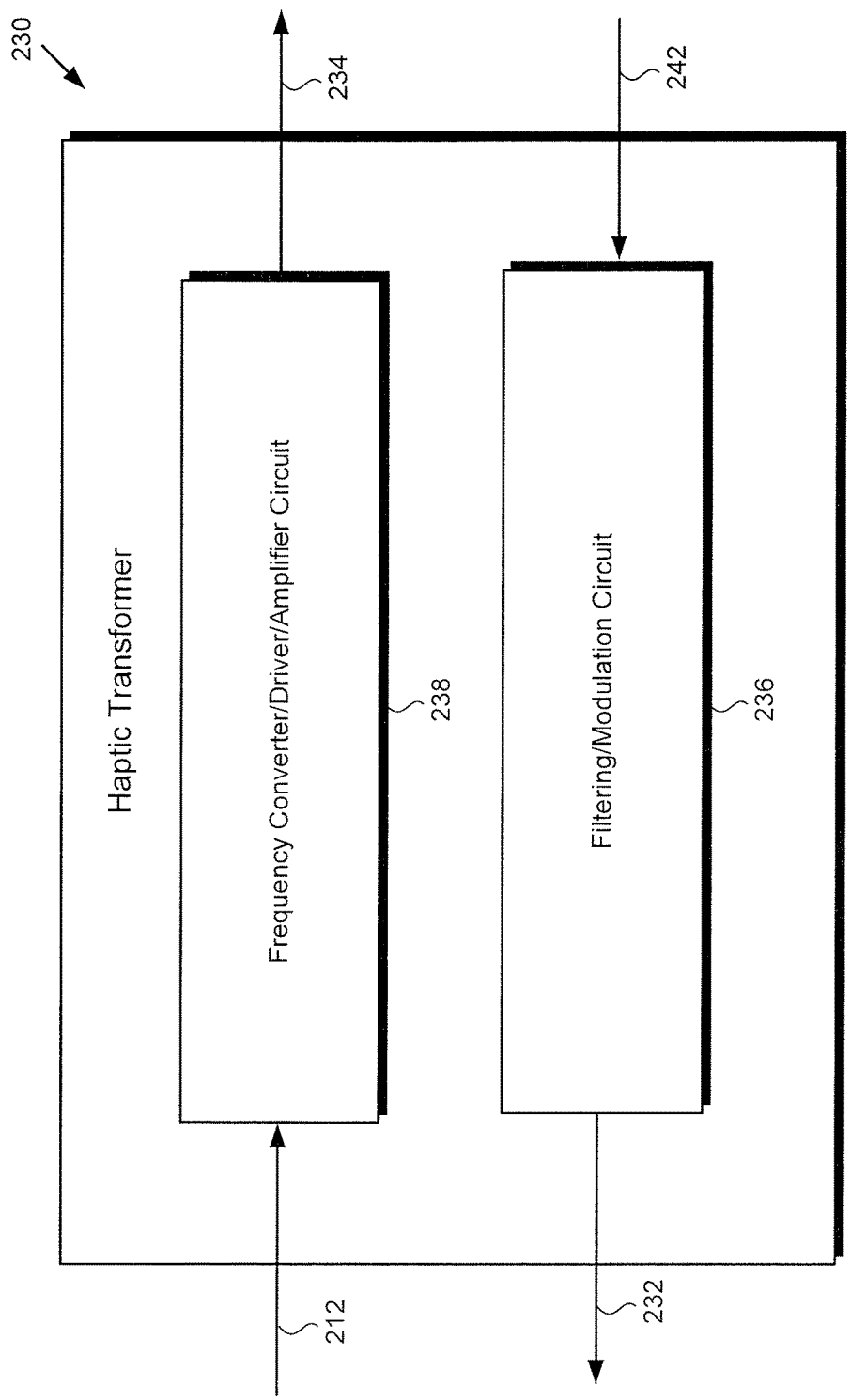
FIG. 2 shows a more detailed diagram of a haptic transformer suitable for use in a haptic effect generation system, according to one implementation.

FIG. 2 shows a more detailed diagram of haptic transformer 230 suitable for use in haptic effect generation system 100, in FIG. 1, according to one implementation. As shown in FIG. 2, haptic transformer 230 includes filtering and modulation circuit 236, and frequency converter, driver, and amplifier circuit 238. As further shown in FIG. 2, haptic transformer 230 is configured to receive input signal 242 from one or more input sources 140, in FIG. 1, and to transform input signal 242 to first audio signal 232 using filtering and modulation circuit 236. In addition, haptic transformer 230 is configured to receive second audio signal 212 from DAC 110, in FIG. 1, and to transform second audio signal 212 to haptic actuator signal 234 using frequency converter, driver, and amplifier circuit 238.

Haptic transformer 230 including filtering and modulation circuit 236, and frequency converter, driver, and amplifier circuit 238, corresponds in general to haptic transformer 130, in FIG. 1, and those two corresponding features may share any of the characteristics attributed to either feature in the present application. Moreover, input signal 242, first audio signal 232, second audio signal 212, and haptic actuator signal 234, in FIG. 2, correspond in general to input signal 142, first audio signal 132, second audio signal 112, and haptic actuator signal 134, in FIG. 1, and may share any of the characteristics attributed to those corresponding features in the present application.

Filtering and modulation circuit 236 and frequency converter, driver, and amplifier circuit 238 may each include an analog circuit. For example, each of filtering and modulation circuit 236 and frequency converter, driver, and amplifier circuit 238 may be implemented using readily available audio circuit components, such as audio mixers, filters, drivers, and amplifiers, for example. Haptic transformer 130/230 uses filtering and modulation circuit 236 to transform input signal 142/242, which has a non-zero frequency, to first audio signal 132/232 having a frequency in the audio band, i.e., up to approximately twenty kilohertz (20 kHz). Haptic transformer 130/230 uses frequency converter, driver, and amplifier circuit 238 to transform second audio signal 112/212, which may be an up to 20 kHz signal, to lower frequency haptic actuator signal 134/234. In some implementations, for example, haptic actuator signal 134/234 may have a frequency of less than or approximately equal to 300 Hz.

Figure 3:
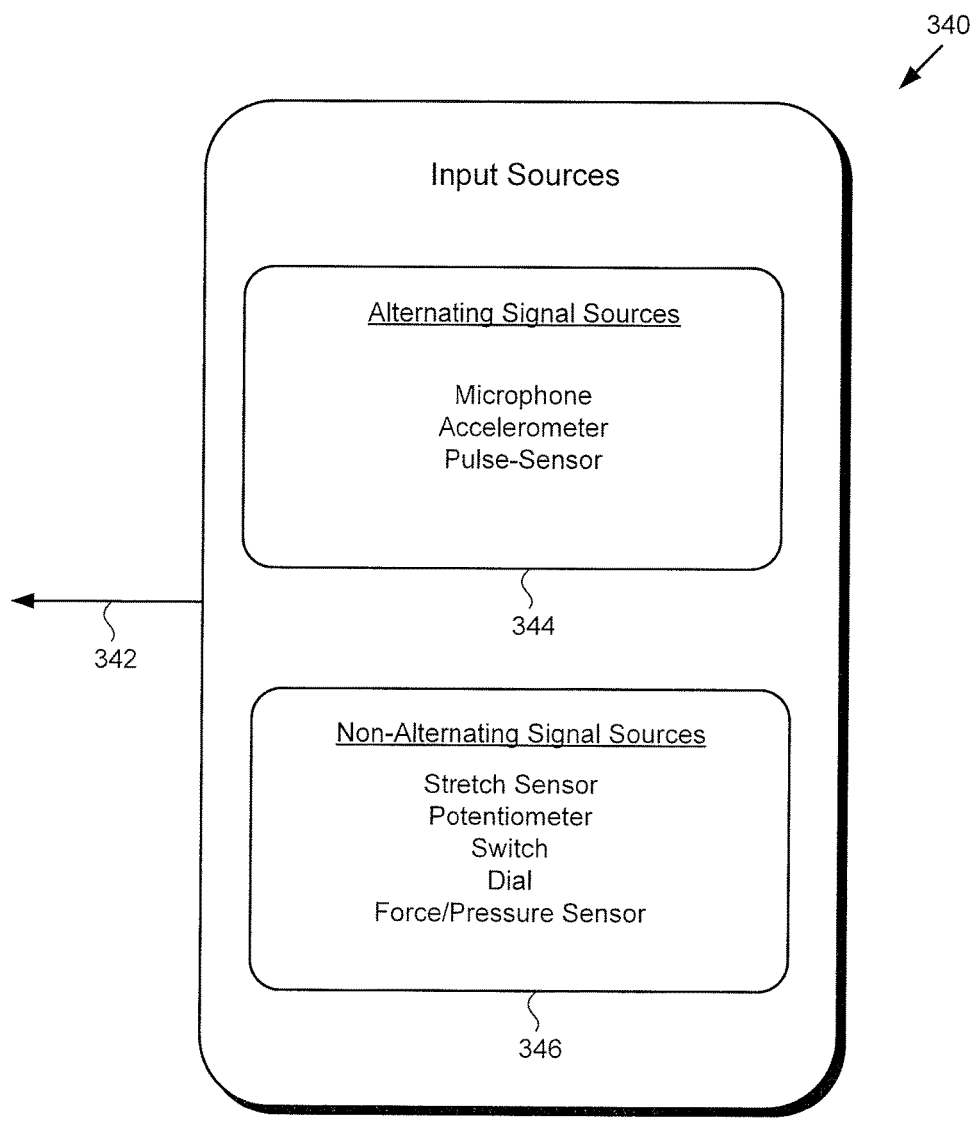
FIG. 3 shows a more detailed diagram of input sources suitable for use with a haptic effect generation system, according to one implementation.

FIG. 3 shows a more detailed diagram of input sources 340 suitable for use with haptic effect generation system 100, in FIG. 1, according to one implementation. As shown in FIG. 3, input sources 340 may include one or more alternating signal sources 344, and/or one or more non-alternating signal sources 346 for producing input signal 342. Input sources 340 including one or more alternating signal sources 344 and/or one or more non-alternating signal sources 346 correspond in general to one or more input sources 140, in FIG. 1. Thus, one or more input sources 140 may share any of the characteristics attributed to corresponding input sources 340 in the present application. In addition, input signal 342 corresponds in general to input signal 142/242 in FIG. 1/2, and may share any of the characteristics attributed to those corresponding features in the present application.

Alternating signal sources 344 may include one or more of a microphone, accelerometer, and pulse-sensor, for example. Examples of non-alternating signal sources 346 include stretch sensors, potentiometers, switches and dials, and force or pressure sensors. In implementations in which one or more non-alternating signal sources 346 are utilized, haptic transformer 130/230 or input sources 140/340 may include circuitry for passing an oscillating signal through each non-alternating signal source to produce one or more input signals corresponding to input signal 142/242. By contrast, in implementations in which one or more alternating signal sources 344 are utilized, the alternating signal source or sources 344 may produce input signal 142/242 directly.

Figure 4A:
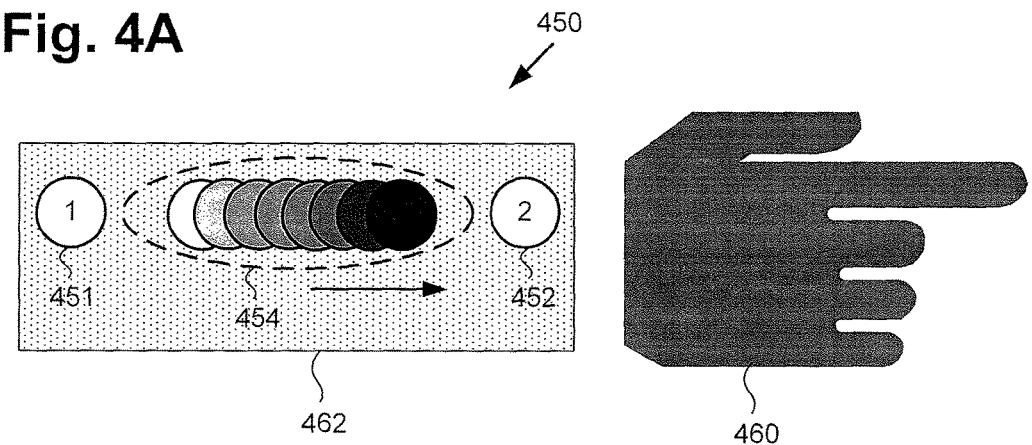
FIG. 4A depicts an exemplary haptic effect produced by a haptic effect generation system, according to one implementation.
Figure 4B:
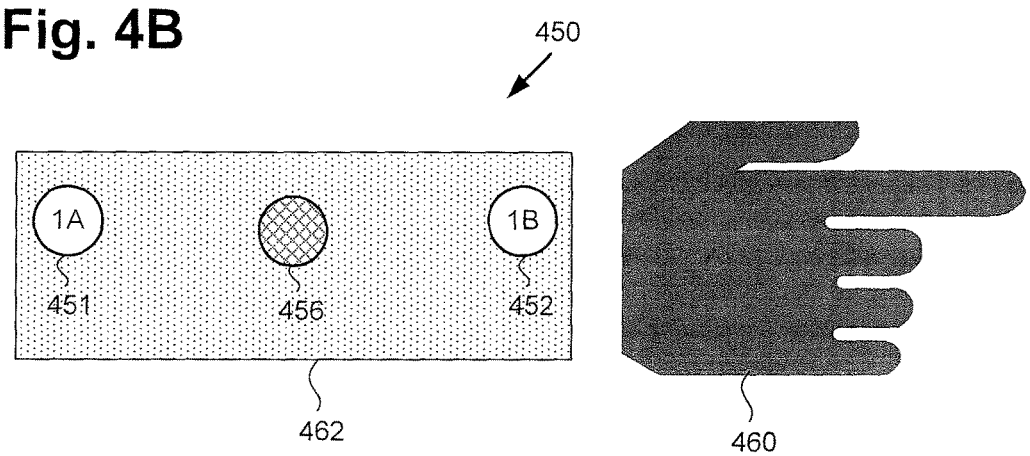
FIG. 4B depicts another exemplary haptic effect produced by a haptic effect generation system, according to one implementation.
Figure 4C:
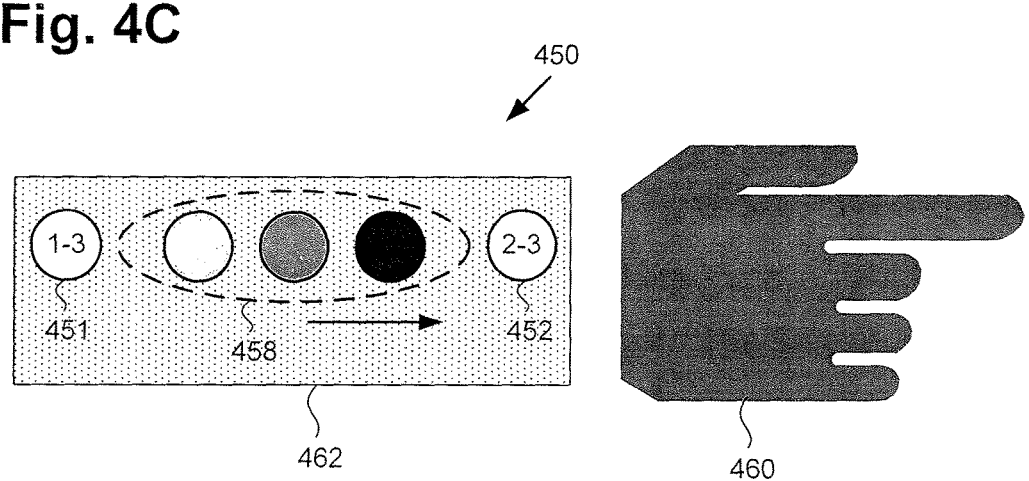
FIG. 4C depicts yet another exemplary haptic effect produced by a haptic effect generation system, according to one implementation.

FIGS. 4A, 4B, and 4C depict exemplary haptic effects produced by a haptic effect generation system, according to one implementation. Each of FIGS. 4A, 4B, and 4C shows an exemplary hand 460 and forearm 462 of a human user experiencing the haptic effect depicted in the respective figure. In addition, each of FIGS. 4A, 4B, and 4C shows haptic actuators 450 including first haptic actuator 451 and second haptic actuator 452. Haptic actuators 450 including first and second haptic actuators 451 and 452 correspond in general to haptic actuators 150, in FIG. 1. Thus, haptic actuators 150 may share any of the characteristics attributed to corresponding haptic actuators 450 in the present application.

First and second haptic actuators 451 and 452 may take the form of vibratory elements, and may be implemented using one or more of speakers, subwoofers, buzzers, bone conductors, and piezo elements, for example. Use of at least two haptic actuators, such as first and second haptic actuators 451 and 452, advantageously enables generation of haptic stereo effects.

It is noted that although FIGS. 4A, 4B, and 4C depict the generation of haptic effects through use of two haptic actuators shown as first and second haptic actuators 451 and 452, in other implementations, haptic actuators 150/450 may include more than two haptic actuators. It is further noted that although FIGS. 4A, 4B, and 4C depict the generation of haptic effects through contact of first and second haptic actuators 451 and 452 with forearm 462 for conceptual clarity, more generally, haptic actuators 150/450 may be situated so as to contact both hands, the torso, a leg or legs, or the head of the user experiencing the haptic effect.

In FIG. 4A, the haptic effect produced using first and second haptic actuators 451 and 452 is apparent tactile motion sensation 454. Apparent tactile motion sensation 454 can be produced by applying consecutive stimulations at two different locations using first and second haptic actuators 451 and 452. For example, a first stimulation at location 1 using first haptic actuator 451 is followed by a second stimulation at location 2 using second haptic actuator 452. The result of those two consecutive stimulations is apparent tactile motion sensation 454, in which the user experiencing the haptic effect perceives an illusory stimulation traveling from location 1 to location 2.

In FIG. 4B, the haptic effect produced using first and second haptic actuators 451 and 452 is phantom tactile sensation 456. Phantom tactile sensation 456 can be produced by applying substantially simultaneous stimulations at two different locations using first and second haptic actuators 451 and 452. For example, a first stimulation at location 1A using first haptic actuator 451 is applied substantially simultaneously with a second stimulation at location 1B using second haptic actuator 452. The result of those two substantially simultaneous stimulations is phantom tactile sensation 456, in which the user experiencing the haptic effect perceives an illusory stimulation applied at a location between locations 1A and 1B. The intensity and perceived location of phantom tactile sensation 456 is determined by the intensities of the real stimulations applied using first and second haptic actuators 451 and 452.

In FIG. 4C, the haptic effect produced using first and second haptic actuators 451 and 452 is sensory saltation effect 458, also known as the "cutaneous rabbit" illusion. Sensory saltation effect 458 can be produced by applying consecutive sets of stimulations at two different locations using first and second haptic actuators 451 and 452. For example, three brief stimulations at location 1-3 using first haptic actuator 451 may be followed by three brief stimulations at location 2-3 using second haptic actuator 452. The result of those two consecutive sets of stimulations is sensory saltation effect 458, in which the user experiencing the haptic effect perceives a sensation of jumping on and between locations 1-3 and 2-3.

The features shown in FIGS. 1, 2, 3, 4A, 4B, and 4C of the present application will be further described by reference to FIG. 5, which presents flowchart 500 outlining an exemplary method for generating haptic effects, according to one implementation. With respect to the method outlined in FIG. 5, it is noted that certain details and features have been left out of flowchart 500 in order not to obscure the discussion of the inventive features in the present application.

Referring to FIG. 5 in combination with FIGS. 1, 2, and 3, flowchart 500 begins with receiving input signal 142/242/342 (action 510). As shown in FIG. 1/2, input signal 142/242/342 may be received by haptic transformer 130/230 of haptic effect generation system 100 from input source or sources 140/340. As noted above, in some implementations, haptic effect generation system 100 may include one or more input sources 140/340. As further noted above, in some implementations, one or more input sources 140/340 may be alternating signal sources capable of producing input signal 142/242/342 directly.

However, and as also noted above, in some implementations, one or more input sources 140/340 may be non-alternating signal sources 346, such as resistance sensors, for example, incapable of producing input signal 142/242/342 having a signal frequency other than zero. In those implementations, haptic transformer 130/230 or input sources 140/340 may include circuitry for generating an oscillating signal for passing through each of one or more non-alternating signal sources 346 to produce input signal 142/242/342 having a non-zero frequency.

Flowchart 500 continues with transforming input signal 142/242/342 to first audio signal 132/232 corresponding to input signal 142/242/342 (action 520). As shown in FIG. 1/2, input signal 142/242/342 is transformed to first audio signal 132/232 by haptic transformer 130/230, using filtering and modulation circuit 236. As discussed above, filtering and modulation circuit 236 may include an analog circuit. For example, filtering and modulation circuit 236 may be implemented using readily available, and even off-the-shelf, audio circuit components, such as audio mixers, filters, drivers, and amplifiers, for example. Haptic transformer 130/230 uses filtering and modulation circuit 236 to transform input signal 142/242 having a non-zero frequency to first audio signal 132/232 having a frequency in the audio band, i.e., a frequency of up to approximately 20 kHz.

Flowchart 500 continues with converting first audio signal 132/232 to first audio data 122 (action 530). Conversion of first audio signal 132/232 to first audio data 122 may be performed by ADC 108 of computing platform 102, under the control of hardware processor 104, for example.

Flowchart 500 continues with receiving first audio data 122 from ADC 108 (action 540). First audio data 122 may be received from ADC 108 by hardware processor 104 executing haptic software code 120.

Flowchart 500 continues with generating second audio data 124 corresponding to a desired haptic effect, using first audio data 122 (action 550). Generation of second audio data 124 corresponding to a desired haptic effect, using first audio data 122, may be performed by hardware processor 104 executing haptic software code 120.

Haptic software code 120 includes audio processing software for performing audio mixing and audio production. Haptic software code 120, when executed by hardware processor 104, may generate second audio data 124 corresponding to the haptic effects illustrated in FIGS. 4A, 4B, and 4C, for example. That is to say, haptic software code 120, when executed by hardware processor 104, may generate second audio data 124 corresponding to a desired haptic effect such as apparent tactile motion sensation 454, phantom tactile sensation 456, or sensory saltation effect 458, as well as others.

Flowchart 500 continues with converting second audio data 124 to second audio signal 112/212 (action 560). Conversion of second audio data 124 to second audio signal 112/212 may be performed by DAC 110 of computing platform 102, under the control of hardware processor 104, for example.

Flowchart 500 continues with transforming second audio signal 112/212 to haptic actuator signal 134/234 for producing the desired haptic effect (action 570). As shown in FIG. 1/2, second audio signal 112/212 is transformed to haptic actuator signal 134/234 by haptic transformer 130/230, using frequency converter, driver, and amplifier circuit 238. As discussed above, frequency converter, driver, and amplifier circuit 238 may include an analog circuit. For example, frequency converter, driver, and amplifier circuit 238 may be implemented using readily available, and even off-the-shelf, audio circuit components, such as audio mixers, filters, drivers, and amplifiers, for example. Haptic transformer 130/230 uses frequency converter, driver, and amplifier circuit 238 to transform second audio signal 112/212, which may be an up to 20 kHz audio band signal, to lower frequency haptic actuator signal 134/234. As noted above, in some implementations, for example, haptic actuator signal 134/234 may have a frequency of less than or approximately equal to 300 Hz.

Flowchart 500 can conclude with producing haptic actuator signal 134/234 as an output (action 580). As shown in FIG. 1/2, haptic transformer 130/230 produces haptic actuator signal 134/234 as an output for use by haptic actuators 150/450 to produce the desired haptic effect. In some implementations, as discussed above by reference to FIGS. 4A, 4B, and 4C, the desired haptic effect may be one of apparent tactile motion sensation 454, phantom tactile sensation 456, and sensory saltation effect 458.

The audio processing capabilities provided by haptic software code 120, combined with the functionality provided by haptic transformer 130/230, advantageously enable the use of high-speed, high-bandwidth audio channels for the generation of desired haptic effects using haptic actuator signal 134/234. According to the implementations disclosed in the present application, input signal 142/242/342 can be received and processed so as to generate haptic actuator signal 134/234 corresponding to a desired haptic effect in real time with respect to input signal 142/242/342 received from input sources 140/340.

The haptic effect generation systems and methods disclosed in the present application can be implemented in any of a wide variety of use cases in which coherent, real time, haptic feedback complements a user experience. Examples of such use cases include video games, movies, sporting events, and theme park attractions such as rides and virtual reality interactive experiences. In addition, the haptic effect generation systems and methods disclosed herein can be utilized to enable couches, beds, tables, walls, and other architecture and furniture to react to user actions.

Moreover, in some implementations, the present haptic effect generation systems and methods may be employed to provide therapeutic and/or assistive services. For example, haptic feedback can be used to complement relaxation and meditation, monitor and guide breathing, and provide therapeutic massage. In yet another use case, the present haptic effect generation systems and methods may be incorporated into smart vests, smart belts, or headgear configured to provide directional and awareness cues to motor cycle riders, athletes, and construction workers, for example.

Thus, the present application discloses haptic effect generation systems and methods enabling the creation, editing, storing, sharing, and broadcasting of haptic data files corresponding respectively to a broad range of haptic effects. The haptic effect generation systems disclosed in the present application can be implemented through use of a computing platform coupled to a haptic transformer and including a hardware processor for executing a haptic software code. In addition, the haptic transformer can advantageously be implemented using readily available audio based hardware components. As a result, the haptic effect generation systems and methods disclosed in the present application are advantageously easy to use, simple to adopt, and can be implemented to produce a wide variety of haptic user interactions.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A haptic effect generation system comprising:
a computing platform including a hardware processor, an analog-to-digital converter (ADC), a digital-to-analog converter (DAC), and a memory storing a haptic software code; and
a haptic transformer coupled to the computing platform, the haptic transformer configured to receive a non-audio input signal having a non-zero frequency, and to transform the non-audio input signal to a first audio signal corresponding to the non-audio input signal;
the ADC configured to convert the first audio signal to a first audio data;
the hardware processor configured to execute the haptic software code to:
receive the first audio data from the ADC; and
generate a second audio data using the first audio data, wherein the second audio data corresponds to a desired haptic effect;
the DAC configured to convert the second audio data to a second audio signal; and
the haptic transformer further configured to transform the second audio signal to a haptic actuator signal for producing the desired haptic effect.

2. The haptic effect generation system of claim 1, wherein the haptic transformer is further configured to produce the haptic actuator signal as an output.

3. The haptic effect generation system of claim 1, wherein the hardware processor is further configured to save the second audio data in a haptic data file.

4. The haptic effect generation system of claim 1, wherein the haptic transformer comprises a filtering and modulation circuit for transforming the non-audio input signal to the first audio signal.

5. The haptic effect generation system of claim 1, wherein the haptic transformer comprises a frequency converter, driver, and amplifier circuit for transforming the second audio signal to the haptic actuator signal.

6. The haptic effect generation system of claim 1, wherein the haptic actuator signal has a frequency of less than or equal to approximately three hundred hertz.

7. The haptic effect generation system of claim 1, further comprising an input source generating the non-audio input signal.

8. The haptic effect generation system of claim 7, wherein the input source comprises at least one of an accelerometer, a pulse sensor, a stretch sensor, a potentiometer, a switch, a dial, a force sensor, and a pressure sensor.

9. The haptic effect generation system of claim 1, further comprising first and second haptic actuators.

10. The haptic effect generation system of claim 1, wherein the desired haptic effect is one of an apparent tactile motion sensation, a phantom tactile sensation, and a sensory saltation effect.

11. A method for use by a haptic effect generation system including a haptic transformer coupled to a computing platform having a hardware processor, an analog-to-digital converter (ADC), a digital-to-analog converter (DAC), and a memory storing a haptic software code, the method comprising:
receiving, by the haptic transformer, a non-audio input signal;
transforming, by the haptic transformer, the non-audio input signal to a first audio signal corresponding to the non-audio input signal;
converting, by the ADC, the first audio signal to a first audio data;
receiving, by the hardware processor executing the haptic software code, the first audio data from the ADC;
generating, by the hardware processor executing the haptic software code, a second audio data using the first audio data, the second audio data corresponding to a desired haptic effect;
converting, by the DAC, the second audio data to a second audio signal; and
transforming the second audio signal to a haptic actuator signal for producing the desired haptic effect.

12. The method of claim 11, further comprising:
producing, by the haptic transformer, the haptic actuator signal as an output.

13. The method of claim 11, further comprising:
saving, by the haptic software code executed by the hardware processor, the second audio data in a haptic data file.

14. The method of claim 11, wherein the haptic transformer comprises a filtering and modulation circuit for transforming the non-audio input signal to the first audio signal, and a frequency converter, driver, and amplifier circuit for transforming the second audio signal to the haptic actuator signal.

15. The method of claim 14, wherein at least one of the filtering and modulation circuit and the frequency converter, driver, and amplifier circuit includes an analog circuit.

16. The method of claim 11, wherein the haptic actuator signal has a frequency of less than or equal to approximately three hundred hertz.

17. The method of claim 11, further comprising using first and second haptic actuators to produce the desired haptic effect.

18. The method of claim 11, wherein the desired haptic effect is one of an apparent tactile motion sensation, a phantom tactile sensation, and a sensory saltation effect.

19. The method of claim 11, further comprising generating the non-audio input signal using at least one of an accelerometer, a pulse sensor, a stretch sensor, a potentiometer, a switch, a dial, a force sensor, and a pressure sensor.

20. The method of claim 11, wherein the haptic actuator signal has a frequency of less than or equal to approximately three hundred hertz.

* * * * *